(12) United States Patent  (10) Patent No.: US 8,400,535 B2
Nakajima                    (45) Date of Patent:     Mar. 19, 2013

(54) SOLID-STATE IMAGE PICKUP DEVICE FOR REMOVING FIXED PATTERN NOISE

(75) Inventor: Shinichi Nakajima, Tokyo (JP)

(73) Assignee: Olympus Corporation, Tokyo (JP)

( * ) Notice: Subject to any disclaimer, the term of this patent is extended or adjusted under 35 U.S.C. 154(b) by 601 days.

(21) Appl. No.: 12/633,389

(22) Filed: Dec. 8, 2009

(65) Prior Publication Data

US 2010/0141808 A1    Jun. 10, 2010

(30) Foreign Application Priority Data

Dec. 9, 2008 (JP) ................................ 2008-313052

(51) Int. Cl.
    *H04N 5/228* (2006.01)

(52) U.S. Cl. .................. 348/245; 348/241; 348/243

(58) Field of Classification Search ........... 348/241–251
    See application file for complete search history.

(56) References Cited

U.S. PATENT DOCUMENTS 7,911,506 B2 * 3/2011 Suzuki ....................... 348/229.1
2001/0055068 A1 * 12/2001 Funakoshi et al. ............ 348/243
2005/0140795 A1 * 6/2005 Hisamatsu et al. ........ 348/222.1

FOREIGN PATENT DOCUMENTS

JP     2005-167918 A     6/2005

* cited by examiner

*Primary Examiner* — Chieh M Fan
*Assistant Examiner* — Dwight C Tejano
(74) *Attorney, Agent, or Firm* — Westerman, Hattori, Daniels & Adrian, LLP (57) ABSTRACT

A solid-state image pickup device includes a pixel array, a gain adjusting unit that adjusts a gain of a pixel signal, an A/D conversion unit that performs A/D conversion on an image pickup signal, a plurality of fixed pattern noise detection units that detect a fixed pattern noise from a digital image pickup signal, a selecting unit that selects one output from outputs of the plurality of fixed pattern noise detection units, a fixed pattern noise correction unit that corrects the fixed pattern noise included in the digital image pickup signal, and a control unit that controls the gain adjusting unit setting a plurality of gain values, the control unit controlling the plurality of fixed pattern noise detection units detecting the plurality of fixed pattern noise based on the plurality of gain values and storing a plurality of correction values.

17 Claims, 9 Drawing Sheets

SOLID-STATE IMAGE PICKUP DEVICE FOR REMOVING FIXED PATTERN NOISE

BACKGROUND OF THE INVENTION

1. Field of the Invention

The present invention generally relates to a solid-state image pickup device that removes fixed pattern noise from image pickup signals.

Priority is claimed on Japanese Patent Application No. 2008-313052, filed Dec. 9, 2008, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In the field of area image sensor technology, further increase in the number of pixels and the speed of image pickup is necessary. Processing of signals needs to be performed at a higher speed. Processing of analog signals output from pixels in a circuit needs to be performed at a higher speed. Various methods of parallel reading out processing techniques such as reading out signals from pixels in a column at a time and transferring signals in a horizontal direction to a plurality of amplifiers in parallel are developed to achieve further increase in the number of pixels and speed in image pickup.

In parallel processing circuits that use the parallel reading out processing techniques, dispersion in a production process or the like causes dispersion in the characteristics of circuits. The dispersion in the characteristics of circuits generates fixed pattern noise including a striped defect on an output image.

The fixed pattern noise can be removed if noise pattern of the fixed pattern noise is recognized and stored. In a method, the noise pattern is stored in a line memory and is removed by digital signal processing.

When signals of pixels in a column are read out at a time in parallel, variations in characteristics of circuits that read out signals of pixels in a column cause variations in output signals. Variations in input-output characteristics of each column can be classified into roughly three variations, i.e., variations in offset properties, variations in gain properties, and variations in nonlinearity, depending on triggers of the variations. It is required that the variations in offset properties should be suppressed first among these variations, for the variations in offset properties are highly visible in an output image and digital correction for the variations in offset properties is easy.

To make the variations in offset properties recognized as a digital value, it is necessary to prepare a period that gives an input signal of the same fixed level to each of parallel circuits instead of a period that processes an effective pixel and to store variations of outputs of the circuits. The fixed pattern noise including striped defect having offset properties can be corrected by subtracting the amount of the stored variations from the image pickup signal of the effective pixel.

However, since output signals usually have random noises peculiar to analog circuits such as thermal noise and 1/f noise, a filtering process that reduces the random noises is necessary. Japanese Unexamined Patent Application, First Publication, No. 2005-167918 discloses a solid-state image pickup device that reduces the random noise using an averaging method, a correction value obtained by averaging correction values of a plurality of frames to improve the accuracy of the correction value.

SUMMARY OF THE INVENTION

The present invention provides a solid-state image pickup device that can immediately corrects a fixed pattern noise with reflecting change of state, even when the state of the fixed pattern noise changes.

A solid-state image pickup device may include, but is not limited to, a pixel array that includes a plurality of photoelectric conversion elements each of which receives an incident light and outputs a pixel signal, a gain adjusting unit that adjusts a gain of the pixel signal based on a gain value and outputs an image pickup signal, an A/D conversion unit that performs A/D conversion on the image pickup signal and outputs a digital image pickup signal, a plurality of fixed pattern noise detection units that detect a fixed pattern noise from the digital image pickup signal corresponding to the pixel signal from the photoelectric conversion element that is light blocked, the plurality of fixed pattern noise detection units storing a correction value calculated from the fixed pattern noise, the detection and the storing being performed in a blanking interval in one frame interval of the image pickup signal, a selecting unit that selects one output from outputs of the plurality of fixed pattern noise detection units and outputs the output that is selected, the selection being performed based on the gain value that the gain adjusting unit uses in a valid interval in one frame interval of the image pickup signal, a fixed pattern noise correction unit that corrects the fixed pattern noise included in the digital image pickup signal, the correction being performed based on an output of the selecting unit, and a control unit that controls the gain adjusting unit setting a plurality of gain values in the blanking interval, the control unit controlling the plurality of fixed pattern noise detection units detecting the plurality of fixed pattern noise based on the plurality of gain values and storing a plurality of correction values.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
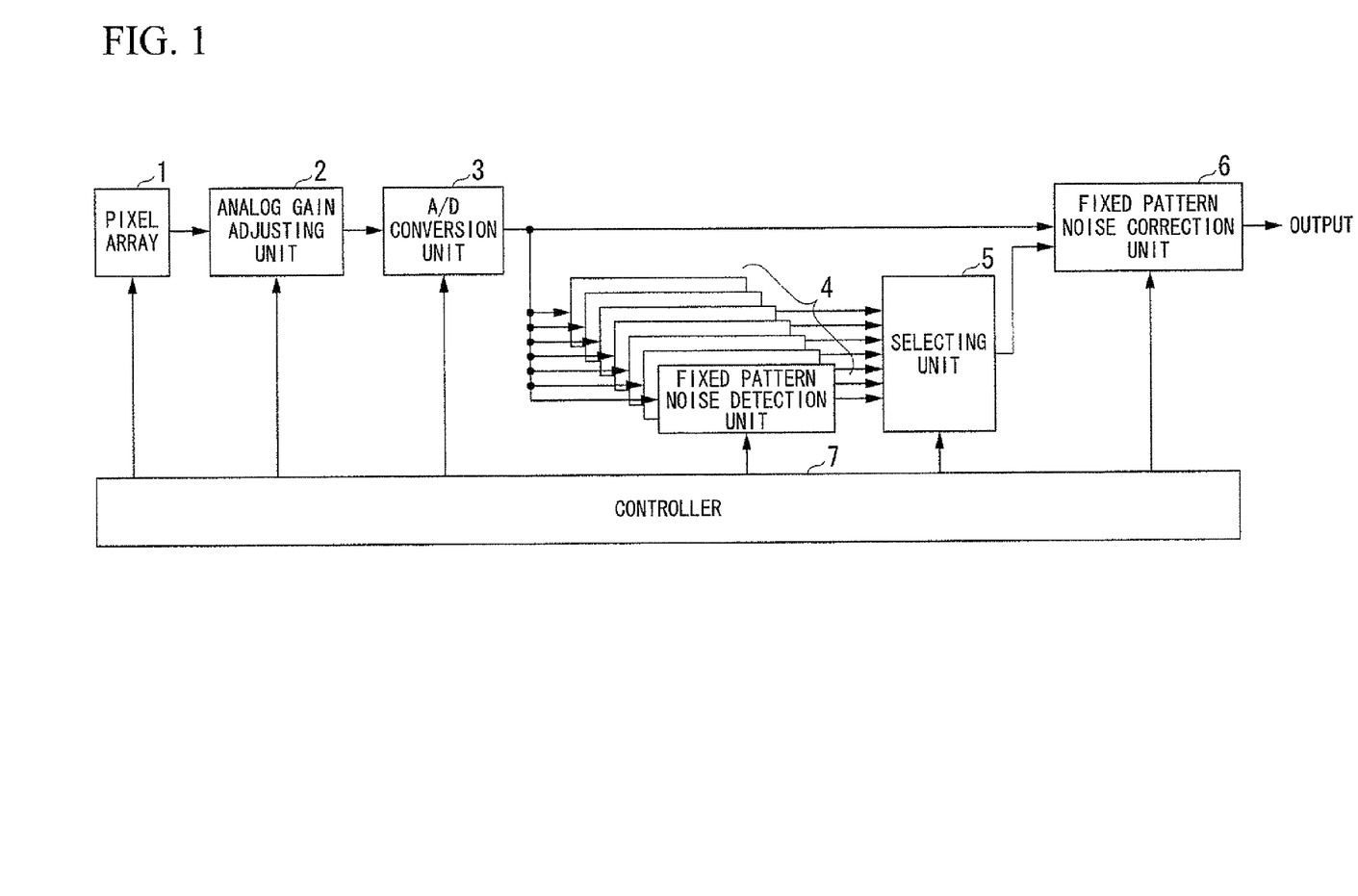
FIG. 1 is a block diagram illustrating a configuration of a solid-state image pickup device in accordance with a first preferred embodiment of the present invention.

A first embodiment of the present invention will be described with reference to the drawings. The first embodiment will be an assumption for a second, third and fourth embodiments described later. FIG. 1 is a block diagram illustrating a configuration of a solid-state image pickup device in accordance with a first preferred embodiment of the present invention. In FIG. 1, a solid-state image pickup device may include, but is not limited to, a pixel array 1, an analog gain adjusting unit 2, an A/D conversion unit 3, a fixed pattern noise detection unit 4, a selecting unit 5, a fixed pattern noise correction unit 6, and a controller 7.

The pixel array 1 includes a plurality of photoelectric conversion elements each of which outputs signals based on an incident light. The pixel array 1 performs a photoelectric conversion by receiving light and accumulating optical charges, and outputs a pixel signal based on the optical charges. The analog gain adjusting unit 2 adjusts the gain of the pixel signal by amplifying or attenuating the pixel signal output from the pixel array 1, and outputs an image pickup signal. The A/D conversion unit 3 performs an A/D conversion of the image pickup signal output from the analog gain adjusting unit 2, and outputs a digital image pickup signal.

The fixed pattern noise detection unit 4 detects a fixed pattern noise including a striped defect based on the digital image pickup signal output from the A/D conversion unit 3, and stores a correction value calculated from the detected fixed pattern noise.

The number of the fixed pattern noise detection units 4 is preferably more than one but is not limited. Detection of the fixed pattern noise by the fixed pattern noise detection unit 4 is performed in a vertical blanking interval in a frame interval of the digital image pickup signal. The fixed pattern noise is detected from the digital image pickup signal corresponding to a pixel signal output from a photoelectric conversion element that is light blocked. The light blocked pixel may be an optical black pixel that is continuously light blocked or an effective pixel when a mechanical shutter is closed.

The selecting unit 5 selects one output from outputs of the plurality of fixed pattern noise detection units 4, and outputs the selected output. The fixed pattern noise correction unit 6 corrects the fixed pattern noise included in the digital image pickup signal output from the A/D conversion unit 3 based on the output of the selecting unit 5. The controller 7 controls whole of the solid-state image pickup device.

Behavior of the solid-state image pickup device of FIG. 1 will be described. Light from a subject is emitted to the pixel array 1 by a lens system that is not illustrated in the figures. The pixel array 1 is driven by a driving pulse that is controlled by the controller 7, and converts the light from the subject to a pixel signal that is an electric signal by a photoelectric conversion. Each of the pixel signals converted in the pixel array 1 is read out in series, and becomes an image pickup signal having applicable amplitude by analog gain adjusting processing in the analog gain adjusting unit 2. A setting value of analog gain, hereinafter referred to as a gain value, that is used for adjusting analog gain is set up in a valid interval in a frame interval of the image pickup signal in the analog gain adjusting unit 2 by the controller 7. A plurality of analog gains are set up in the vertical blanking interval.

The image pickup signal output from the analog gain adjusting unit 2 is converted to the digital image pickup signal by the A/D conversion unit 3. The fixed pattern noise detection unit 4 detects the fixed pattern noise based on the plurality of gain values and stores the correction value calculated from the fixed pattern noise in the vertical blanking interval, which is controlled by the controller 7.

When the controller 7 makes the analog gain adjusting unit 2 change the gain value that is used in adjusting the analog gain of the image pickup signal in the valid interval, the selecting unit 5 selects the output of the fixed pattern noise detection unit 4 that stores the correction value corresponding to the gain value in advance after the changing, which is controlled by the controller 7. The fixed pattern noise correction unit 6 corrects the fixed pattern noise including striped defect by removing the fixed pattern noise of the digital image pickup signal. By storing the fixed pattern noise corresponding to each of the plurality of gain values in advance, proper correction of the fixed pattern noise can be performed shortly after the controller 7 changes the gain value.

Figure 2:
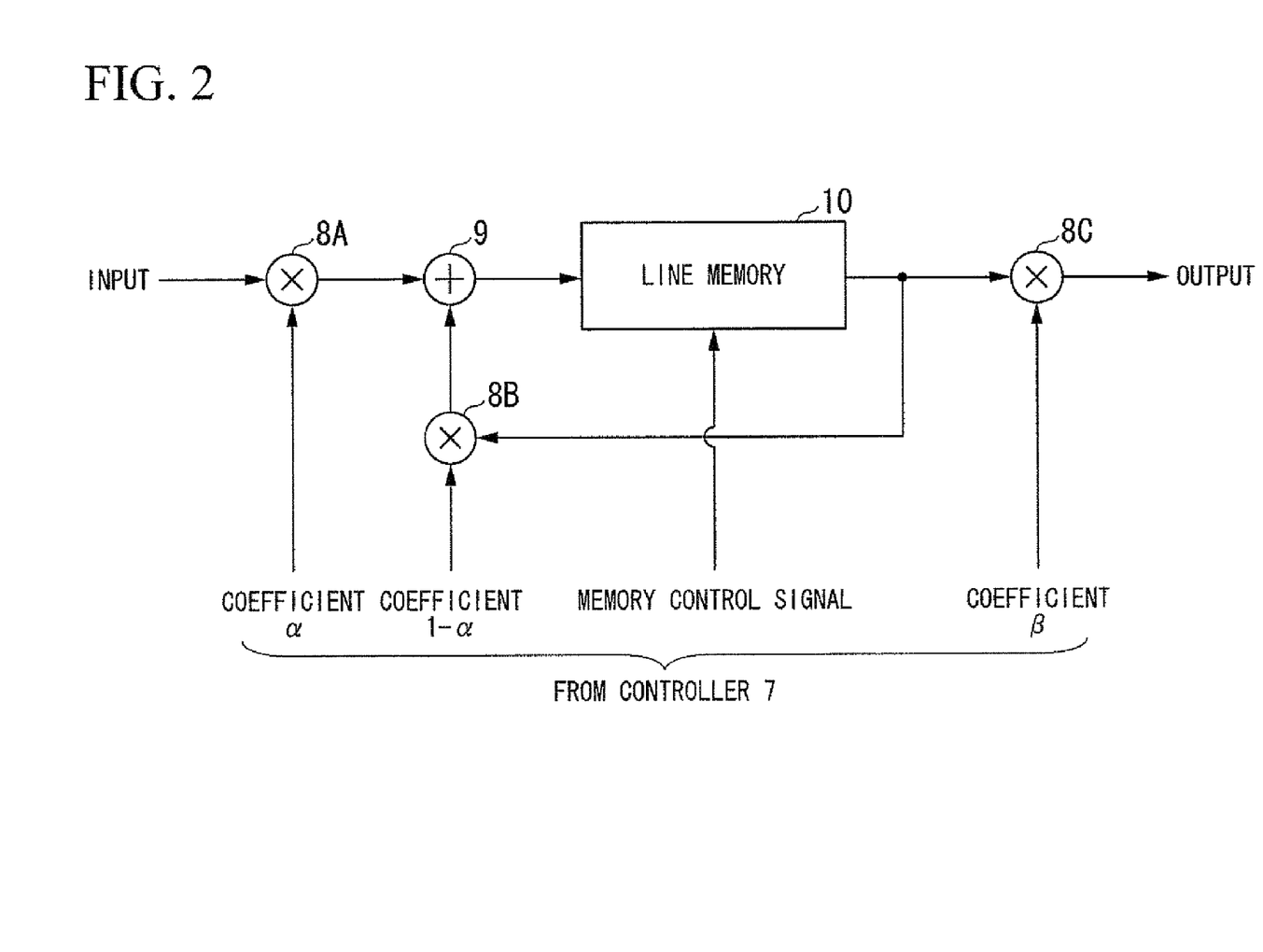
FIG. 2 is a block diagram illustrating a configuration of a fixed pattern noise detection unit that is included in the solid-state image pickup device shown in FIG. 1.

FIG. 2 is a block diagram illustrating a configuration of the fixed pattern noise detection unit 4 that is included in the solid-state image pickup device shown in FIG. 1. The fixed pattern noise detection unit 4 may include, but is not limited to, multipliers 8A, 8B and 8C, an accumulator 9 and a line memory 10.

The multiplier 8A multiplies an input signal by a coefficient $\alpha$ that is set up by the controller 7, and outputs the result. The multiplier 8B multiplies the correction value stored in the line memory 10 by a coefficient $1-\alpha$ that is set up by the controller 7, and outputs the result.

The accumulator 9 adds the output of the multiplier 8A to the output of the multiplier 8B, and generates a correction value of new fixed pattern noise. The line memory 10 stores the output of the accumulator 9 as the correction value based on a memory control signal from the controller 7. The multiplier 8C multiplies the correction value stored in the line memory 10 by a coefficient $\beta$ that is set up by the controller 7, and outputs the result. The coefficient $\beta$ is for adjusting the level of the output from the line memory 10 to the level of bit accuracy of the fixed pattern noise correction unit 6.

The multipliers 8A and 8B, the accumulator 9 and the line memory 10 configure a recursive low-pass filter based on the following formula (A).

$$\text{New correction value} = \text{Input signal} \times \alpha + \text{Old correction value} \times (1-\alpha) \quad (A)$$

Here, $0 < \alpha \leq 1$. Since the rate of the input signal will increase if the value of $\alpha$ becomes large, the value of the fixed pattern noise of a present frame is greatly reflected in the newly generated correction value. Since the rate of the old correction value will increase if the value of $\alpha$ becomes small, the correction value by which a random noise is oppressed is greatly reflected in the newly generated correction value.

In an initial movement, $\alpha$ is set to 1 by the controller 7, and the input signal is stored directly in the line memory 10. After the initial movement, $\alpha$ is set in accordance with $0 < \alpha \leq 1$, and behavior of the recursive low-pass filter is performed.

As described below, in the first preferred embodiment of the invention, the plurality of fixed pattern noises corresponding to the plurality of gain values are detected in advance in the fixed pattern noise detection unit 4 and the plurality of correction values that are calculated based on the plurality of fixed pattern noises are stored in the vertical blanking interval. The fixed pattern noise included in the digital image pickup signal is corrected based on one of the plurality of correction values in accordance with the gain value that the analog gain adjusting unit 2 uses in the valid interval. As a result, even when the state of the fixed pattern noise changes, the fixed pattern noise can be corrected with the change reflected immediately.

Second Embodiment

Figure 3:
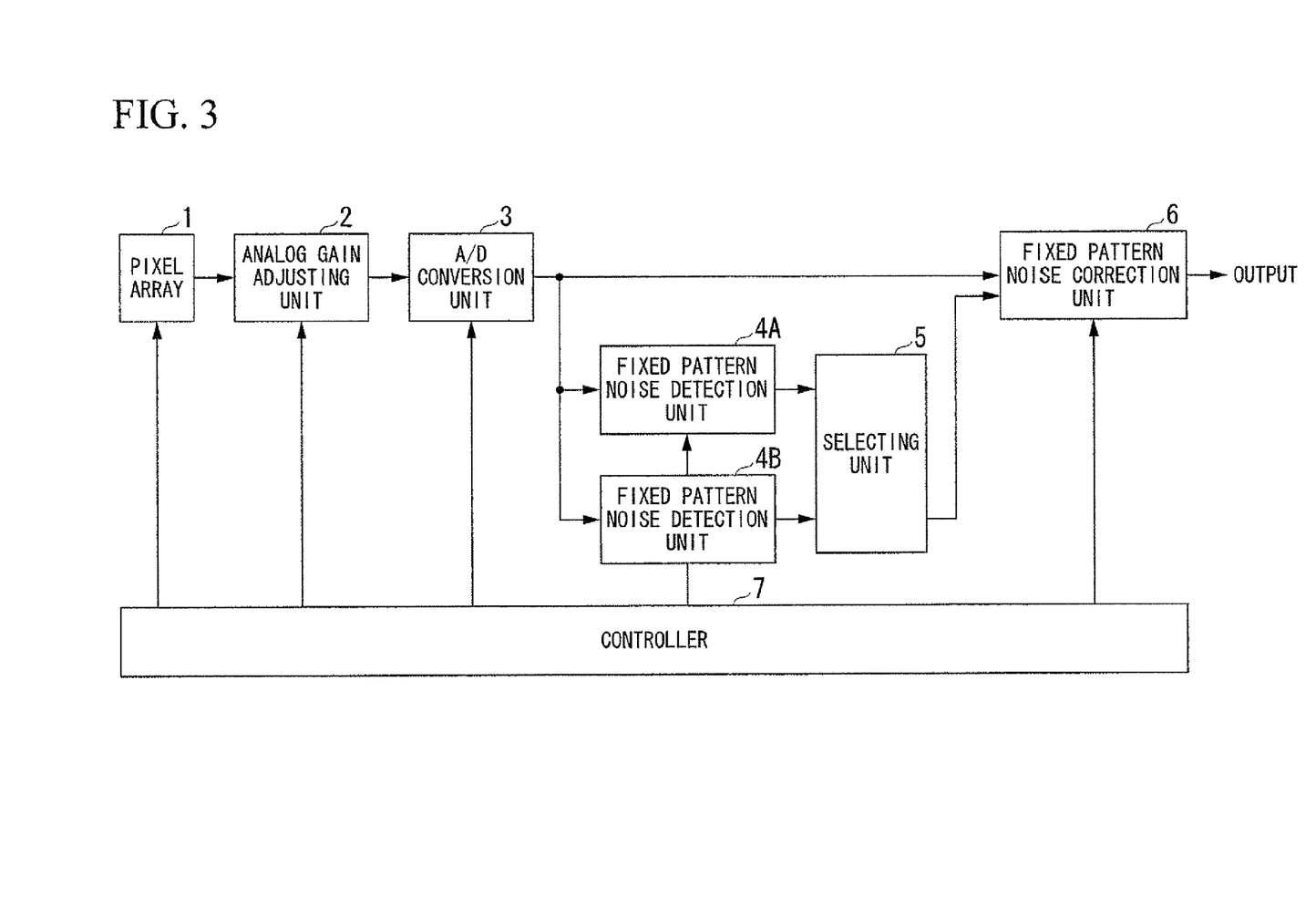
FIG. 3 is a block diagram illustrating a configuration of the solid-state image pickup device in accordance with a second preferred embodiment of the present invention.

A second embodiment of the present invention will be described. FIG. 3 is a block diagram illustrating a configuration of the solid-state image pickup device in accordance with the second preferred embodiment of the present invention. The solid-state image pickup device in accordance with the second preferred embodiment of the present invention differs from the solid-state image pickup device of the first proffered embodiment of the present invention in two fixed pattern noise detection units 4A and 4B instead of two or more fixed pattern noise detection units 4. Configuration of each of the fixed pattern noise detection units 4A and 4B is the same as the fixed pattern noise detection unit 4 illustrated in FIG. 2.

Figure 4:
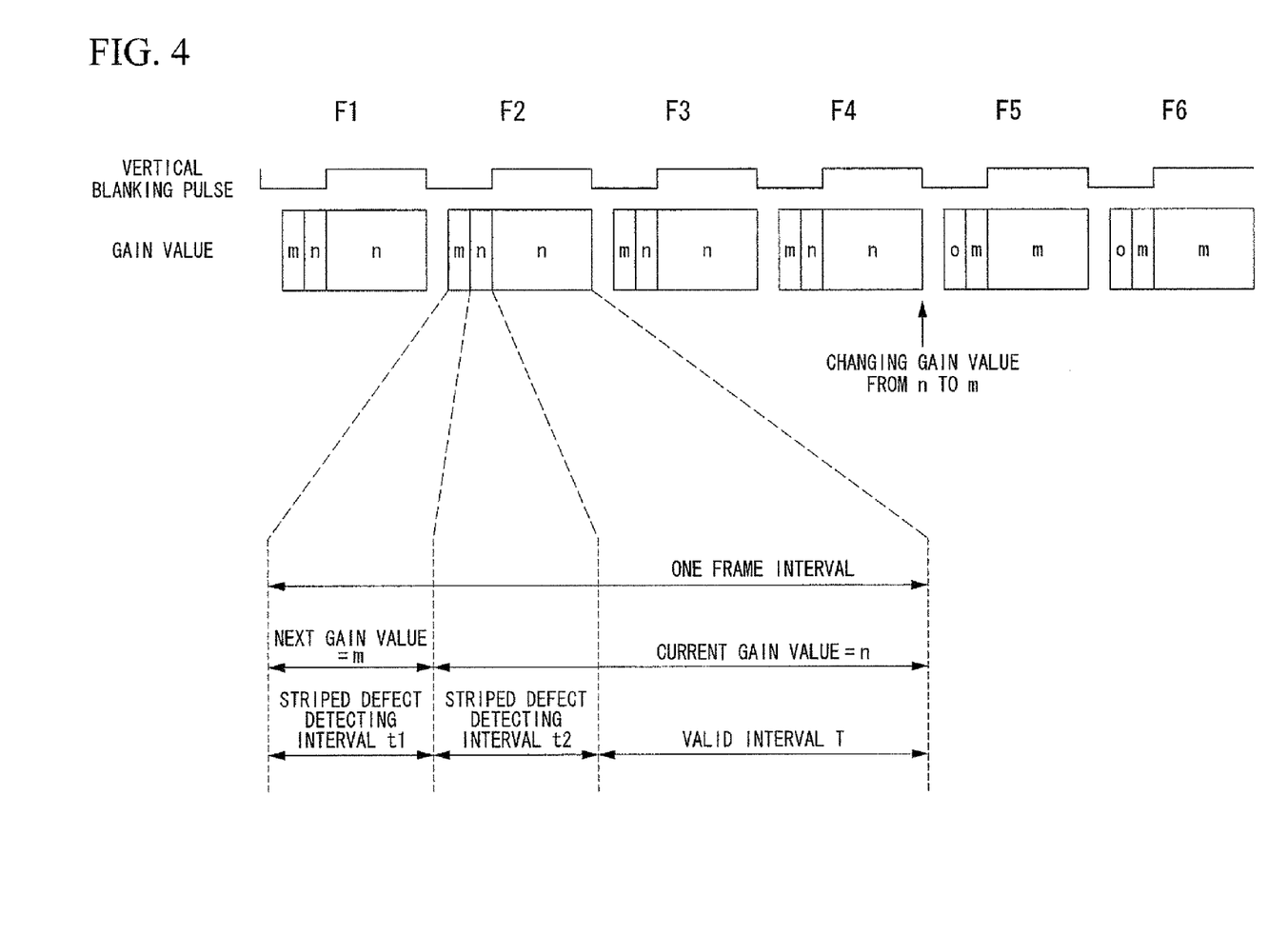
FIG. 4 is a timing chart illustrating operations of the solid-state image pickup device shown in FIG. 3.

FIG. 4 is a timing chart illustrating operations of the solid-state image pickup device shown in FIG. 3. Behavior of the solid-state image pickup device of the second preferred embodiment will be described using FIG. 4. In FIG. 4, a vertical blanking pulse shows the vertical blanking interval in each of the frames of the digital image pickup signal. Term when the vertical blanking pulse is Low is the vertical blanking interval, and term when the vertical blanking pulse is High is the valid interval T. Gain values m, n and o are gain setting values of the analog gain adjusting unit 2, and gain processing is performed using the gain values such as +3 dB or +6 dB for example. References F1, - - - , F6 are the numbers of the frames for description.

In the following description, behavior when the currently used gain value is n and the gain value that will be set next is m will be described. In this behavior, changing of the gain value is programmed beforehand, and image pickup is performed based on the changing of the gain.

In each frame, the vertical blanking interval includes a first striped defect detecting interval t1 and a second striped defect detecting interval t2. In the frames F1, - - - , F4, the gain value of the first striped defect detecting interval t1 is set as m, and the gain values of the second striped defect detecting interval t2 and the valid interval T are set as n, the settings controlled by the controller 7. In the first striped defect detecting interval t1, the fixed pattern noise when the gain value is m is detected by the fixed pattern noise detection unit 4B, the detection controlled by the controller 7. In the second striped defect detecting interval t2, the fixed pattern noise when the gain value is n is detected by the fixed pattern noise detection unit 4A, the detection controlled by the controller 7.

In the frames F1, - - - , F4, the gain value of the valid interval T is set as n, and the selecting unit 5 selects output of the fixed pattern noise detection unit 4A that stores the correction value when the gain value is n and outputs the selected output, which is controlled by the controller 7. The fixed pattern noise correction unit 6 corrects the fixed pattern noise that is included in the digital image pickup signal output from the A/D conversion unit 3 based on the correction value stored in the fixed pattern noise detection unit 4A.

In the frame F5, the controller 7 controls the selecting unit 5 selecting one output from outputs of the fixed pattern noise detection unit 4B and changing the gain value of the analog gain adjusting unit 2 in the valid interval T from n to m. The fixed pattern noise correction unit 6 corrects the fixed pattern noise that is included in the digital image pickup signal output from the A/D conversion unit 3 based on the correction value stored in the fixed pattern noise detection unit 4B. As a result, even after changing the gain value of the valid interval, the correction value corresponding to the gain value can be used. The change of the gain value can be reflected to the correction value immediately, and the correction can be performed accurately.

After the frame F5 in FIG. 4, the gain value that will be set next is o, and the fixed pattern noise detection unit 4A detects the fixed pattern noise and stores the correction value calculated from the fixed pattern noise. After the frame F5, the fixed pattern noise detection unit 4B detects the fixed pattern noise corresponding to the gain value m that is currently used and stores the correction value calculated from the fixed pattern noise.

As described above, in the second preferred embodiment of the invention, in the fixed pattern noise detection units 4A and 4B, two fixed pattern noises corresponding to two gain values are detected respectively beforehand and the correction values calculated from the fixed pattern noises are stored. The fixed pattern noise included in the digital image pickup signal is corrected based on the gain value that the analog gain adjusting unit 2 uses in the valid interval T and either of the correction values stored in the fixed pattern noise detection units 4A and 4B. As a result, even when state of the fixed pattern noise changes, the fixed pattern noise can be corrected with the change reflected immediately.

Third Embodiment

Figure 5:
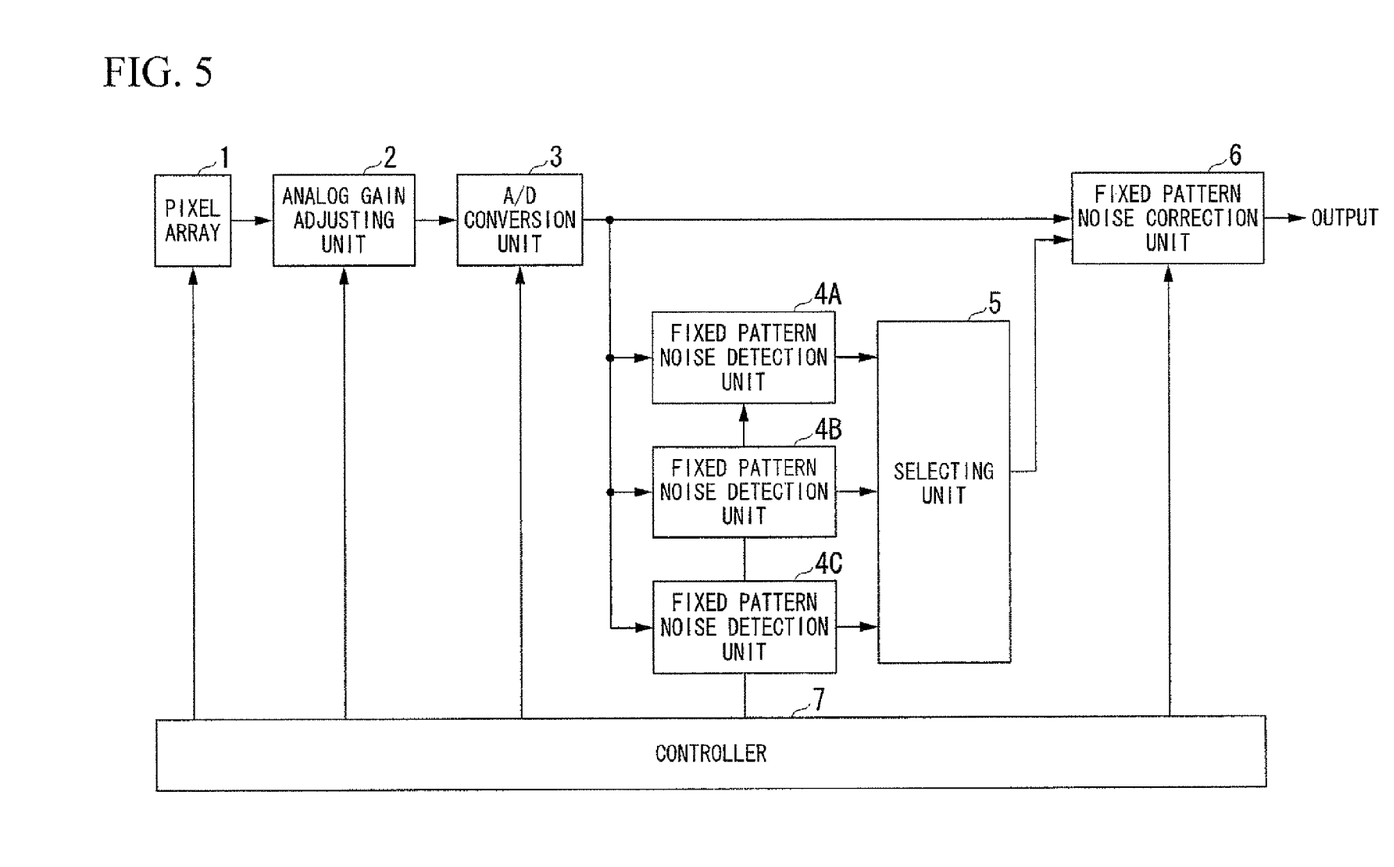
FIG. 5 is a block diagram illustrating a configuration of the solid-state image pickup device in accordance with a third preferred embodiment of the present invention.

A third embodiment of the present invention will be described. FIG. 5 is a block diagram illustrating a configuration of the solid-state image pickup device in accordance with the third preferred embodiment of the present invention. The solid-state image pickup device in accordance with the third preferred embodiment of the present invention differs from the solid-state image pickup device of the second proffered embodiment of the present invention in three fixed pattern noise detection units 4A, 4B and 4C instead of two fixed pattern noise detection units 4A and 4B. Configuration of each of the fixed pattern noise detection units 4A, 4B and 4C is the same as that of the fixed pattern noise detection unit 4 illustrated in FIG. 2.

Figure 6:
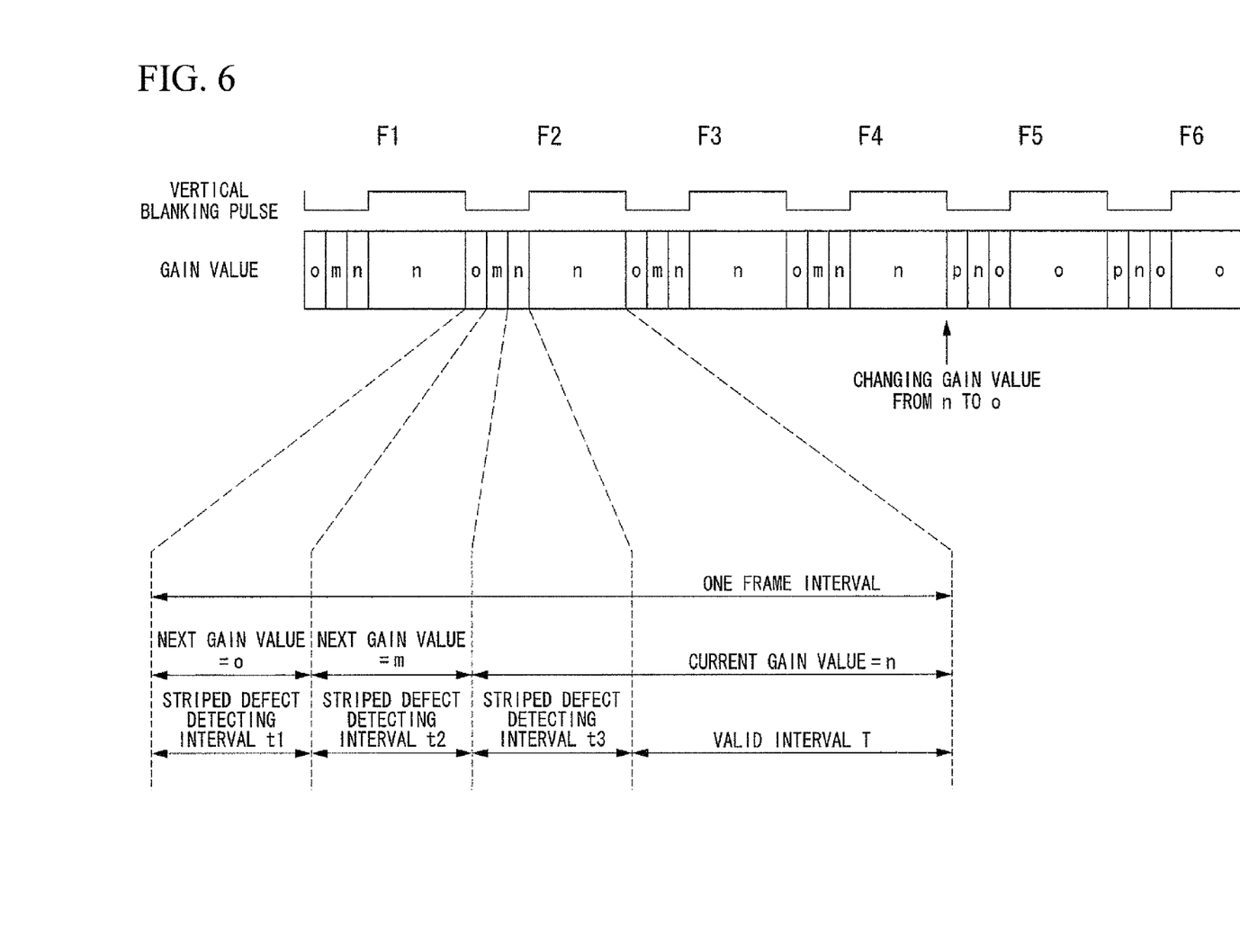
FIG. 6 is a timing chart illustrating operations of the solid-state image pickup device shown in FIG. 5.
Figure 7:
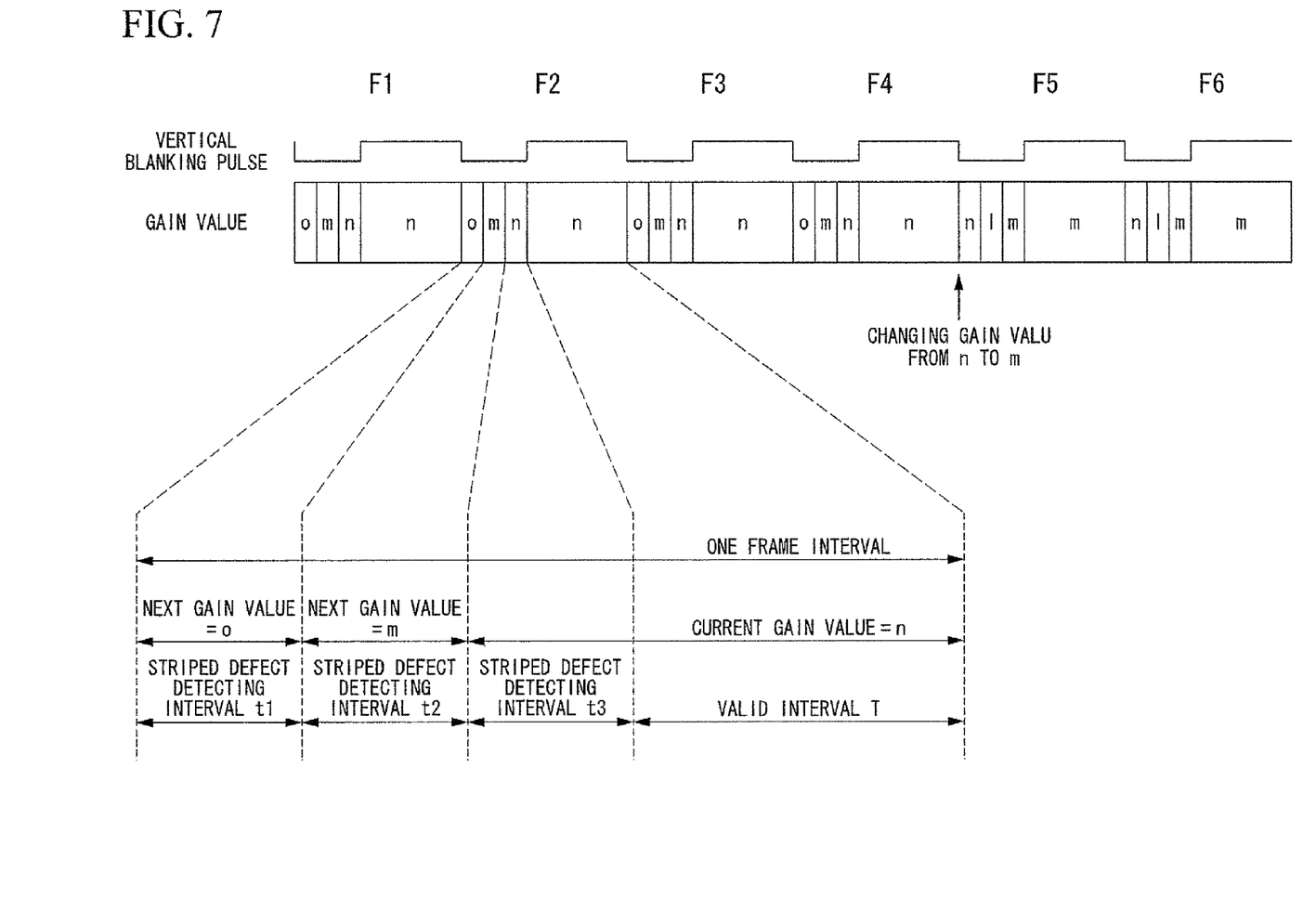
FIG. 7 is a timing chart illustrating operations of the solid-state image pickup device shown in FIG. 5.

FIG. 6 and FIG. 7 are a timing chart illustrating operations of the solid-state image pickup device in accordance with the third preferred embodiment of the present invention. Behavior of the solid-state image pickup device of the third preferred embodiment of the present invention will be described using FIG. 6 and FIG. 7. The behavior of the solid-state image pickup device of the third preferred embodiment differs from the behavior of the solid-state image pickup device of the second preferred embodiment illustrated in FIG. 4 in that it is not predictable whether the gain value that will be set next is m or o while the currently used gain value is n. In the following description, magnitude relation between the gain values m, n and o is m<n<o.

When performing image pickup of moving image in a conventional camera, the gain is not changed extremely in an instant but slowly raised or lowered. In many cases, this adjustment of the gain is performed based on information of current exposure. The fixed pattern noise needs to be detected before a few frames, but at the point before a few frames, whether to raise or lower the gain cannot be judged in many cases.

In each frame of FIG. 6 and FIG. 7, the vertical blanking interval includes a first striped defect detecting interval t1, a second striped defect detecting interval t2, and a third striped defect detecting interval t3. In the frames F1, - - -, F4, the gain value of the first striped defect detecting interval t1 is set as o, the gain value of the second striped defect detecting interval t2 is set as m, and the gain values of the third striped defect detecting interval t3 and the valid interval T are set as n, the settings controlled by the controller 7. In the first striped defect detecting interval t1, the fixed pattern noise when the gain value is o is detected by the fixed pattern noise detection unit 4C, the detection controlled by the controller 7. In the second striped defect detecting interval t2, the fixed pattern noise when the gain value is m is detected by the fixed pattern noise detection unit 4B, the detection controlled by the controller 7. In the third striped defect detecting interval t3, the fixed pattern noise when the gain value is n is detected by the fixed pattern noise detection unit 4A, the detection controlled by the controller 7.

In the frames F1, - - -, F4 of FIG. 6 and FIG. 7, the gain value of the valid interval T is set as n, and the selecting unit 5 selects output of the fixed pattern noise detection unit 4A that stores the correction value when the gain value is n and outputs the selected output, which is controlled by the controller 7. The fixed pattern noise correction unit 6 corrects the fixed pattern noise that is included in the digital image pickup signal output from the A/D conversion unit 3 based on the correction value stored in the fixed pattern noise detection unit 4A.

In the frame F5 of FIG. 6, the controller 7 controls the selecting unit 5 selecting one output from outputs of the fixed pattern noise detection unit 4C and changing the gain value of the analog gain adjusting unit 2 in the valid interval T to o. The fixed pattern noise correction unit 6 corrects the fixed pattern noise that is included in the digital image pickup signal output from the A/D conversion unit 3 based on the correction value stored in the fixed pattern noise detection unit 4C.

In the frame F5 of FIG. 7, the controller 7 controls the selecting unit 5 selecting one output from outputs of the fixed pattern noise detection unit 4B and changing the gain value of the analog gain adjusting unit 2 in the valid interval T to m. The fixed pattern noise correction unit 6 corrects the fixed pattern noise that is included in the digital image pickup signal output from the A/D conversion unit 3 based on the correction value stored in the fixed pattern noise detection unit 4B. As a result, even after changing the gain value of the valid interval, the correction value corresponding to the gain value can be used. The change of the gain value can be reflected to the correction value immediately, and the correction can be performed accurately.

After the frame F5 in FIG. 6, the gain value that will be set next is n or p (o<p) and the fixed pattern noise detection units 4A and 4B detect the fixed pattern noise and store the correction value calculated from the fixed pattern noise. After the frame F5, the fixed pattern noise detection unit 4C detects the fixed pattern noise corresponding to the gain value o that is currently used and stores the correction value calculated from the fixed pattern noise.

In the same way, after the frame F5 in FIG. 7, the gain value that will be set next is l (l<m) or n and the fixed pattern noise detection units 4C and 4A detect the fixed pattern noise and store the correction value calculated from the fixed pattern noise. After the frame F5, the fixed pattern noise detection unit 4B detects the fixed pattern noise corresponding to the currently used gain value o and stores the correction value calculated from the fixed pattern noise.

As described above, in the third preferred embodiment of the invention, in the fixed pattern noise detection units 4A, 4B and 4C, three fixed pattern noises corresponding to three gain values are detected respectively beforehand and the correction values calculated from the fixed pattern noises are stored. The fixed pattern noise included in the digital image pickup signal is corrected based on the gain value that the analog gain adjusting unit 2 uses in the valid interval T and either of the correction values stored in the fixed pattern noise detection units 4A, 4B and 4C. As a result, even when state of the fixed pattern noise changes, the fixed pattern noise can be corrected with the change reflected immediately.

Fourth Embodiment

A fourth embodiment of the present invention will be described. Configuration of the solid-state image pickup device in accordance with the fourth preferred embodiment of the present invention is the same as the configuration of the solid-state image pickup device in accordance with the third preferred embodiment of the present invention illustrated in FIG. 5, so illustration and description of the configuration of the solid-state image pickup device in accordance with the fourth preferred embodiment of the present invention will be omitted.

Figure 8:
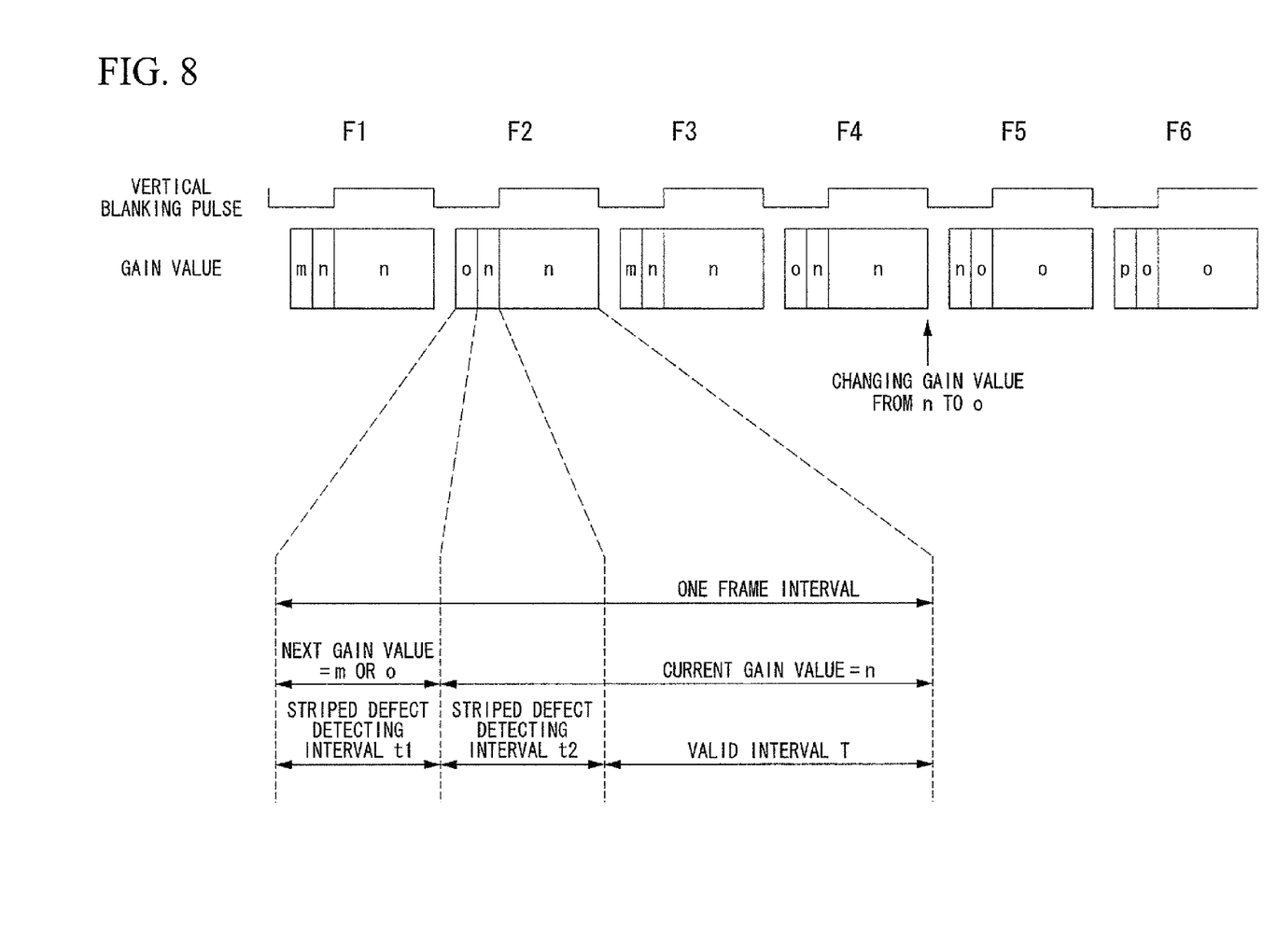
FIG. 8 is a timing chart illustrating operations of the solid-state image pickup device in accordance with a fourth preferred embodiment of the present invention.
Figure 9:
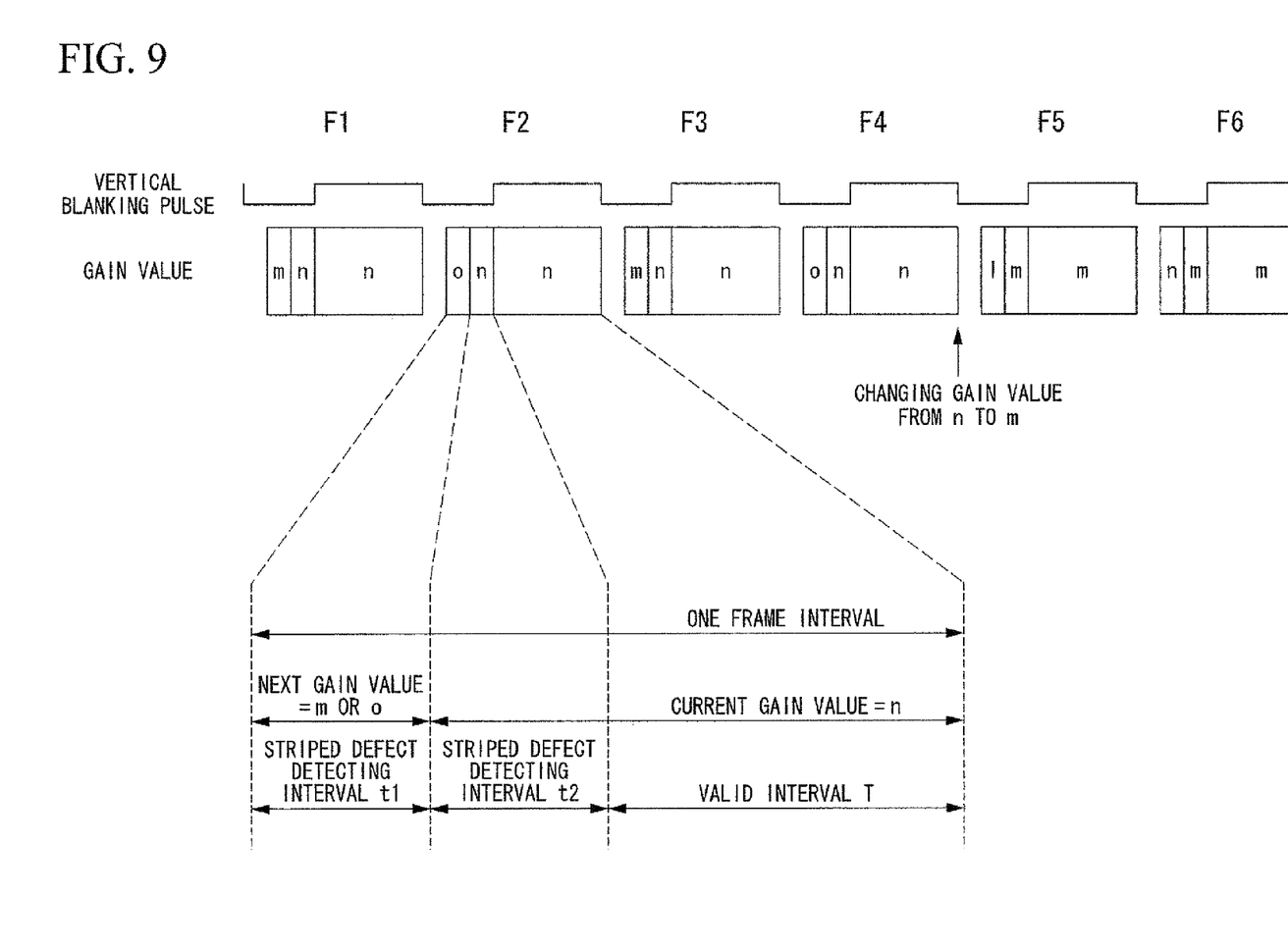
FIG. 9 is a timing chart illustrating operations of the solid-state image pickup device in accordance with the fourth preferred embodiment of the present invention.

FIG. 8 and FIG. 9 are a timing chart illustrating operations of the solid-state image pickup device in accordance with the fourth preferred embodiment of the present invention. Behavior of the solid-state image pickup device of the fourth preferred embodiment of the present invention will be described using FIG. 8 and FIG. 9. The behavior of the solid-state image pickup device of the fourth preferred embodiment differs from the behavior of the solid-state image pickup device of the third preferred embodiment illustrated in FIG. 6 and FIG. 7 in that detection of the fixed pattern noise corresponding to the currently used gain value n is performed in every frame, and detection of the fixed pattern noise corresponding to the gain value m and detection of the fixed pattern noise corresponding to the gain value o are performed alternately in every one frame. In the following description, magnitude relation between the gain values m, n and o is m<n<o.

In each frame of FIG. 8 and FIG. 9, the vertical blanking interval includes a first striped defect detecting interval t1 and a second striped defect detecting interval t2. In the frames F1, - - -, F4, the gain value of the first striped defect detecting interval t1 is set as m or o alternately, and the gain values of the second striped defect detecting interval t2 and the valid interval T are set as n, the settings controlled by the controller 7. In the first striped defect detecting interval t1, the fixed pattern noise when the gain value is m is detected by the fixed pattern noise detection unit 4B and the fixed pattern noise when the gain value is o is detected by the fixed pattern noise detection unit 4C, the detections controlled by the controller 7. In the second striped defect detecting interval t2, the fixed pattern noise when the gain value is n is detected by the fixed pattern noise detection unit 4A, the detection controlled by the controller 7.

In the frames F1, - - -, F4, the gain value of the valid interval T is set as n, and the selecting unit 5 selects output of the fixed pattern noise detection unit 4A that stores the correction value when the gain value is n and outputs the selected output, which is controlled by the controller 7. The fixed pattern noise correction unit 6 corrects the fixed pattern noise that is included in the digital image pickup signal output from the A/D conversion unit 3 based on the correction value stored in the fixed pattern noise detection unit 4A.

In the frame F5 of FIG. 8, the controller 7 controls the selecting unit 5 selecting one output from outputs of the fixed pattern noise detection unit 4C and changing the gain value of the analog gain adjusting unit 2 in the valid interval T to o. The fixed pattern noise correction unit 6 corrects the fixed pattern noise that is included in the digital image pickup signal output from the A/D conversion unit 3 based on the correction value stored in the fixed pattern noise detection unit 4C.

In the frame F5 of FIG. 9, the controller 7 controls the selecting unit 5 selecting one output from outputs of the fixed pattern noise detection unit 4B and changing the gain value of the analog gain adjusting unit 2 in the valid interval T to m. The fixed pattern noise correction unit 6 corrects the fixed pattern noise that is included in the digital image pickup signal output from the A/D conversion unit 3 based on the correction value stored in the fixed pattern noise detection unit 4B. As a result, even after changing the gain value of the valid interval, the correction value corresponding to the gain value can be used. The change of the gain value can be reflected to the correction value immediately, and the correction can be performed accurately. Moreover, the vertical blanking interval can be made shorter than that of the third preferred embodiment, and the frame rate can be made faster.

After the frame F5 in FIG. 8, the gain value that will be set next is n or p (o<p) and the fixed pattern noise detection units 4A and 4B detect the fixed pattern noise and store the correction value calculated from the fixed pattern noise. After the frame F5, the fixed pattern noise detection unit 4C detects the fixed pattern noise corresponding to the currently used gain value o and stores the correction value calculated from the fixed pattern noise.

In the same way, after the frame F5 in FIG. 9, the gain value that will be set next is l (l<m) or n and the fixed pattern noise detection units 4C and 4A detect the fixed pattern noise and store the correction value calculated from the fixed pattern noise. After the frame F5, the fixed pattern noise detection unit 4B detects the fixed pattern noise corresponding to the currently used gain value o and stores the correction value calculated from the fixed pattern noise.

As described above, in the fourth preferred embodiment of the invention, in the fixed pattern noise detection units 4A, 4B and 4C, three fixed pattern noises corresponding to three gain values are detected respectively beforehand and the correction values calculated from the fixed pattern noises are stored. The fixed pattern noise included in the digital image pickup signal is corrected based on the gain value that the analog gain adjusting unit 2 uses in the valid interval T and either of the correction values stored in the fixed pattern noise detection units 4A, 4B and 4C. As a result, even when state of the fixed pattern noise changes, the fixed pattern noise can be corrected with the change reflected immediately.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. For example, the analog gain adjusting unit 2 may have configuration such as a column amplifier that amplifiers every column of the pixel array 1. The A/D conversion unit 3 may have configuration that performs an A/D conversion in every column of the pixel array 1. The fixed pattern noise detection unit 4, the selecting unit 5, the fixed pattern noise correction unit 6, the controller 7, and so on may be disposed on the same substrate as the pixel array 1, or may be disposed on other substrate. Accordingly, the invention is not to be considered as being limited by the foregoing description, and is only limited by the scope of the appended claims.

What is claimed is:

1. A solid-state image pickup device comprising:
a pixel array that includes a plurality of photoelectric conversion elements, the photoelectric conversion element receives an incident light and outputs a pixel signal;
a gain adjusting unit that adjusts gain of the pixel signal based on a gain value and outputs an image pickup signal;
an A/D conversion unit that performs A/D conversion on the image pickup signal and outputs a digital image pickup signal;
a plurality of fixed pattern noise detection units that detect a fixed pattern noise from the digital image pickup signal corresponding to the pixel signal from the photoelectric conversion element that is light blocked, the plurality of fixed pattern noise detection units storing a correction value calculated from the fixed pattern noise, the detection and the storing performed in a blanking interval in one frame interval of the image pickup signal;
a selecting unit that selects one of outputs of the plurality of fixed pattern noise detection units and outputs the selected output, the selection performed on the gain value that the gain adjusting unit uses in a valid interval in one flame interval of the image pickup signal;
a fixed pattern noise correction unit that corrects the fixed pattern noise included in the digital image pickup signal, the correction performed based on output of the selecting unit and a control unit that controls the gain adjusting unit setting a plurality of gain values in the blanking interval, the control unit controlling the plurality of fixed pattern noise detection units detecting the plurality of fixed pattern noise based on the plurality of gain values and storing a plurality of correction values, wherein
the plurality of fixed pattern noise detection units comprises a first fixed pattern noise detection unit, a second fixed pattern noise detection unit, and a third fixed pattern noise detection unit,
the control unit controls the gain adjusting unit setting a first gain value, a second gain value that is larger than the first gain value, and a third gain value that is smaller than the first gain value, which is performed in the blanking interval that is in the same one frame interval as the valid interval in which the gain adjusting unit uses the first gain value,
the control unit controls the first fixed pattern noise detection unit performing a first detection of a first fixed pattern noise from the digital image pickup signal based on the first gain value and a first storing of a first correction value calculated from the first fixed pattern noise in the blanking interval,
the control unit controls the second fixed pattern noise detection unit performing a second detection of a second fixed pattern noise from the digital image pickup signal based on the second gain value and a second storing of a second correction value calculated from the second fixed pattern noise in the blanking interval,
the control unit controls the third fixed pattern noise detection unit performing a third detection of a third fixed pattern noise from the digital image pickup signal based on the third gain value and a third storing of a third correction value calculated from the third fixed pattern noise in the blanking interval, when the gain adjusting unit changes the gain value that the gain adjusting unit uses from the first gain value to the second gain value in the valid interval, the control unit controls the gain adjusting unit changing the gain value that the gain adjusting unit uses from the first gain value to the second gain value, which is performed after the second detection and the second storing have finished, and when the gain adjusting unit changes the gain value that the gain adjusting unit uses from the first gain value to the third gain value in the valid interval, the control unit controls the gain adjusting unit changing the gain value that the gain adjusting unit uses from the first gain value to the third gain value, which is performed after the third detection and the third storing have finished.

2. The solid-state image pickup device according to claim 1, wherein
the control unit controls the first fixed pattern noise detection unit detecting the first fixed pattern noise and storing the first correction value in every frame,
the control unit controls the second fixed pattern noise detection unit detecting the second fixed pattern noise and storing the second correction value,
the control unit controls the third fixed pattern noise detection unit detecting the third fixed pattern noise and storing the third correction value, and
a first set of the second detection and the second storing, and a second set of the third detection and the third storing are performed alternately in every frame.

3. A solid-state image pickup device comprising:
a pixel array that includes a plurality of photoelectric conversion elements, the photoelectric conversion element receives an incident light and outputs a pixel signal;
a gain adjusting unit that adjusts gain of the pixel signal based on a first gain value or second gain value and outputs an image pickup signal;
an A/D conversion unit that performs A/D conversion on the image pickup signal and outputs a digital image pickup signal;
a first fixed pattern noise detection unit that detects a first fixed pattern noise from the digital image pickup signal and stores a first correction value calculated from the first fixed pattern noise;
a second fixed pattern noise detection unit that detects a second fixed pattern noise from the digital image pickup signal and stores a second correction value calculated from the second fixed pattern noise;
a selecting unit that selects one of outputs of the first fixed pattern noise detection unit and the second fixed pattern noise detection unit and outputs the selected output; and
a fixed pattern noise correction unit that corrects the first fixed pattern noise or the second fixed pattern noise included in the digital image pickup signal, the correction performed based on output of the selecting unit, wherein
the selecting of one output from outputs of either the first fixed pattern noise detection unit or the second fixed pattern noise detection unit and the outputting of the selected output are performed based on the gain value that the gain adjusting unit uses in a valid interval in one frame interval of the digital image pickup signal.

4. A solid-state image pickup device comprising:
a pixel array that includes a plurality of photoelectric conversion elements, the photoelectric conversion element receives an incident light and outputs a pixel signal;
a gain adjusting unit that adjusts gain of the pixel signal based on a first gain value or second gain value and outputs an image pickup signal;
an A/D conversion unit that performs A/D conversion on the image pickup signal and outputs a digital image pickup signal;
a first fixed pattern noise detection unit that detects a first fixed pattern noise from the digital image pickup signal and stores a first correction value calculated from the first fixed pattern noise;
a second fixed pattern noise detection unit that detects a second fixed pattern noise from the digital image pickup signal and stores a second correction value calculated from the second fixed pattern noise;
a selecting unit that selects one of outputs of the first fixed pattern noise detection unit and the second fixed pattern noise detection unit and outputs the selected output;
a fixed pattern noise correction unit that corrects the first fixed pattern noise or the second fixed pattern noise included in the digital image pickup signal, the correction performed based on output of the selecting unit, and
a control unit that controls the first fixed pattern noise detection unit detecting the first fixed pattern noise based on the first gain value and storing the first correction value, the control unit controlling the second fixed pattern noise detection unit detecting the second fixed pattern noise based on the second gain value and storing the second correction value, wherein
the setting of the first gain value and the second gain value is performed in a blanking interval in one frame interval of the digital image pickup signal.

5. A solid-state image pickup device comprising:
a pixel array that includes a plurality of photoelectric conversion elements, the photoelectric conversion element receives an incident light and outputs a pixel signal;
a gain adjusting unit that adjusts gain of the pixel signal based on a first gain value or second gain value and outputs an image pickup signal;
an A/D conversion unit that performs A/D conversion on the image pickup signal and outputs a digital image pickup signal;
a first fixed pattern noise detection unit that detects a first fixed pattern noise from the digital image pickup signal and stores a first correction value calculated from the first fixed pattern noise;
a second fixed pattern noise detection unit that detects a second fixed pattern noise from the digital image pickup signal and stores a second correction value calculated from the second fixed pattern noise;
a selecting unit that selects one of outputs of the first fixed pattern noise detection unit and the second fixed pattern noise detection unit and outputs the selected output;
a fixed pattern noise correction unit that corrects the first fixed pattern noise or the second fixed pattern noise included in the digital image pickup signal, the correction performed based on output of the selecting unit and
a control unit that controls the first fixed pattern noise detection unit detecting the first fixed pattern noise based on the first gain value and storing the first correction value, the control unit controlling the second fixed pattern noise detection unit detecting the second fixed pattern noise based on the second gain value and storing the second correction value, wherein
the first detection, the first storing, the second detection, and the second storing are performed in a blanking interval in one frame interval of the digital image pickup signal.

6. A solid-state image pickup device comprising:
a pixel array that includes a plurality of photoelectric conversion elements, the photoelectric conversion element receives an incident light and outputs a pixel signal;
a gain adjusting unit that adjusts gain of the pixel signal based on a first gain value or second gain value and outputs an image pickup signal;
an A/D conversion unit that performs A/D conversion on the image pickup signal and outputs a digital image pickup signal;
a first fixed pattern noise detection unit that detects a first fixed pattern noise from the digital image pickup signal and stores a first correction value calculated from the first fixed pattern noise;
a second fixed pattern noise detection unit that detects a second fixed pattern noise from the digital image pickup signal and stores a second correction value calculated from the second fixed pattern noise;
a selecting unit that selects one of outputs of the first fixed pattern noise detection unit and the second fixed pattern noise detection unit and outputs the selected output;
a fixed pattern noise correction unit that corrects the first fixed pattern noise or the second fixed pattern noise included in the digital image pickup signal, the correction performed based on output of the selecting unit; and
a control unit that controls the first fixed pattern noise detection unit detecting the first fixed pattern noise based on the first gain value and storing the first correction value, the control unit controlling the second fixed pattern noise detection unit detecting the second fixed pattern noise based on the second gain value and storing the second correction value, wherein
the control unit controls the gain adjusting unit changing the gain value that the gain adjusting unit uses from the first gain value to the second gain value, which is performed after the second detection and the second storing have finished.

7. A solid-state image pickup device comprising:
a pixel array that includes a plurality of photoelectric conversion elements each of which receives an incident light and outputs a pixel signal;
a gain adjusting unit that adjusts a gain of the pixel signal based on a first gain value, a second gain value or a third gain value and outputs an image pickup signal;
an A/D conversion unit that performs A/D conversion on the image pickup signal and outputs a digital image pickup signal;
a first fixed pattern noise detection units that performs a first detection of a first fixed pattern noise from the digital image pickup signal and a first storing of a first correction value calculated from the first fixed pattern noise;
a second fixed pattern noise detection units that performs a second detection of a second fixed pattern noise from the digital image pickup signal and a second storing of a second correction value calculated from the second fixed pattern noise;
a third fixed pattern noise detection units that performs a third detection of a third fixed pattern noise from the digital image pickup signal and a third storing of a third correction value calculated from the third fixed pattern noise;
a selecting unit that performs a selecting of one output from outputs of either the first fixed pattern noise detection unit, the second fixed pattern noise detection unit or the third fixed pattern noise detection unit and an outputting of a selected output; and a fixed pattern noise correction unit that corrects the first fixed pattern noise, the second fixed pattern noise or the third fixed pattern noise included in the digital image pickup signal, which is performed based on an output of the selecting unit.

8. The solid-state image pickup device according to claim 7, further comprising:
a control unit that controls the gain adjusting unit performing a setting of the first gain value, the second gain value and the third gain value, the control unit controlling the first fixed pattern noise detection unit performing the first detection of the first fixed pattern noise based on the first gain value and the first storing of the first correction value, the control unit controlling the second fixed pattern noise detection unit performing the second detection of the second fixed pattern noise based on the second gain value and the second storing of the second correction value, the control unit controlling the third fixed pattern noise detection unit performing the third detection of the third fixed pattern noise based on the third gain value and the third storing of the third correction value.

9. The solid-state image pickup device according to claim 8, wherein
the setting of the first gain value, the second gain value and the third gain value is performed in a blanking interval in one frame interval of the digital image pickup signal.

10. The solid-state image pickup device according to claim 8, wherein
the first detection, the first storing, the second detection, the second storing, the third detection, and the third storing are performed in a blanking interval in one frame interval of the digital image pickup signal.

11. The solid-state image pickup device according to claim 8, wherein
when the gain adjusting unit changes the gain value that the gain adjusting unit uses from the first gain value to the second gain value in a valid interval in one frame interval of the digital image pickup signal, the control unit controls the gain adjusting unit changing the gain value that the gain adjusting unit uses from the first gain value to the second gain value, which is performed after the detection of the second fixed pattern noise based on the second gain value and the storing of the second correction value have finished, and
when the gain adjusting unit changes the gain value that the gain adjusting unit uses from the first gain value to the third gain value in the valid interval, the control unit controls the gain adjusting unit changing the gain value that the gain adjusting unit uses from the first gain value to the third gain value, which is performed after the detection of the third fixed pattern noise based on the third gain value and the storing of the third correction value have finished.

12. The solid-state image pickup device according to claim 8, wherein
the control unit controls the first fixed pattern noise detection unit detecting the first fixed pattern noise and storing the first correction value in every frame,
the control unit controls the second fixed pattern noise detection unit detecting the second fixed pattern noise and storing the second correction value,
the control unit controls the third fixed pattern noise detection unit detecting the third fixed pattern noise and storing the third correction value, and a first set of the second detection and the second storing, and a second set of the third detection and the third storing are performed alternately in every frame.

13. The solid-state image pickup device according to claim 7, wherein
the first detection of the first fixed pattern noise, the second detection of the second fixed pattern noise and the third detection of the third fixed pattern noise are performed in a blanking interval in one frame interval of the digital image pickup signal.

14. The solid-state image pickup device according to claim 7, wherein
the first fixed pattern noise, the second fixed pattern noise and the third fixed pattern noise are detected from the digital image pickup signal output from the A/D conversion unit based on the pixel signal output from the photoelectric conversion element that is light blocked.

15. The solid-state image pickup device according to claim 7, wherein
the selecting of one output from outputs of either the first fixed pattern noise detection unit,
the second fixed pattern noise detection unit or the third fixed pattern noise detection unit and the outputting of the selected output is performed based on the gain value that the gain adjusting unit uses in a valid interval in one frame interval of the digital image pickup signal.

16. A method of correcting fixed pattern noise comprising:
receiving an incident light and outputting a pixel signal;
adjusting gain of the pixel signal based on a gain value and outputting an image pickup signal;
performing A/D conversion on the image pickup signal and outputting a digital image pickup signal;
detecting a fixed pattern noise from the digital image pickup signal corresponding to the pixel signal generated by light blocked and storing a correction value calculated from the fixed pattern noise, the detecting and the storing performed in a blanking interval in one frame interval of the image pickup signal;
selecting one of the plurality of correction values based on the gain value and outputting a selected correction value, the selecting and the outputting performed in a valid interval in one frame interval of the image pickup signal;
correcting the fixed pattern noise included in the digital image pickup signal, the correction performed based on the selected correction value;
setting a plurality of gain values in the blanking interval, detecting the plurality of fixed pattern noise based on the plurality of gain values and storing a plurality of correction values;
setting a first gain value, a second gain value that is larger than the first gain value, and a third gain value that is smaller than the first gain value, which is performed in the blanking interval that is in the same one frame interval as the valid interval in which the first gain value is used in the adjusting of gain of the pixel signal;
detecting a first fixed pattern noise based on the first gain value and storing a first correction value calculated from the first fixed pattern noise in the blanking interval;
detecting a second fixed pattern noise based on the second gain value and storing a second correction value calculated from the second fixed pattern noise in the blanking interval;
detecting a third fixed pattern noise based on the third gain value and storing a third correction value calculated from the third fixed pattern noise in the blanking interval;
when changing the gain value that is used in the adjusting of gain of the pixel signal from the first gain value to the second gain value in the valid interval, changing the first gain value to the second gain value, which is performed after the detection of the second fixed pattern noise based on the second gain value and the storing of the second correction value have finished; and
when changing the gain value that is used in the adjusting of gain of the pixel signal from the first gain value to the third gain value in the valid interval, changing the first gain value to the third gain value, which is performed after the detection of the third fixed pattern noise based on the third gain value and the storing of the third correction value have finished.

17. A method of correcting fixed pattern noise according to claim 16, further comprising:
performing a first detection of the first fixed pattern noise and a first storing of the first correction value in every frame;
performing a second detection of the second fixed pattern noise and a second storing of the second correction value; and
performing a third detection of the third fixed pattern noise and a third storing of the third correction value,
wherein a first set of the second detection and the second storing, and a second set of the third detection and the third storing are performed alternately in every frame.

* * * * *